July 24, 1934.  W. J. ANDRES  1,967,389
BRAKE OPERATING MECHANISM
Original Filed March 2, 1929
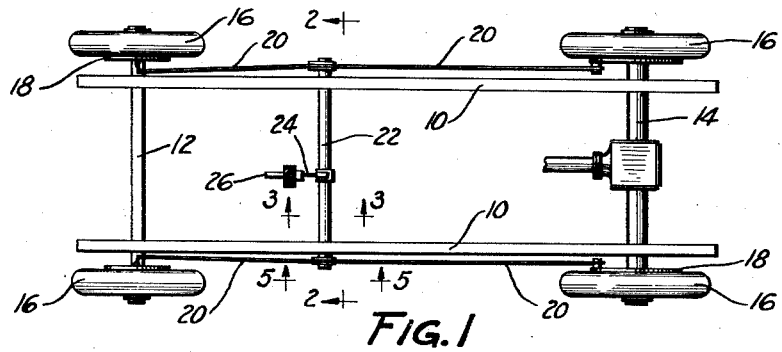
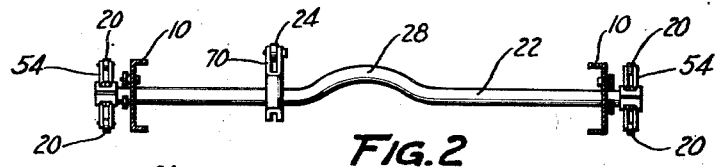
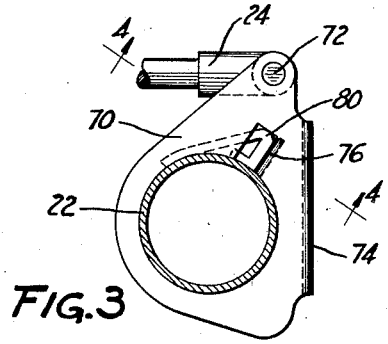
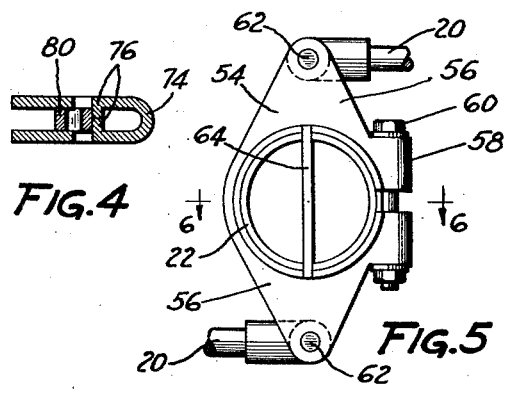
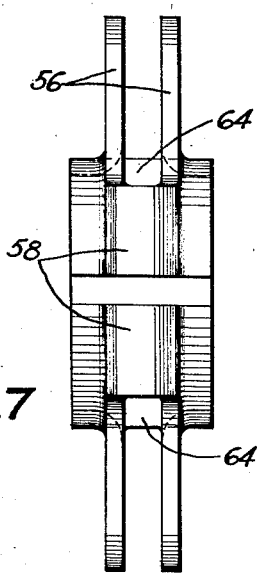
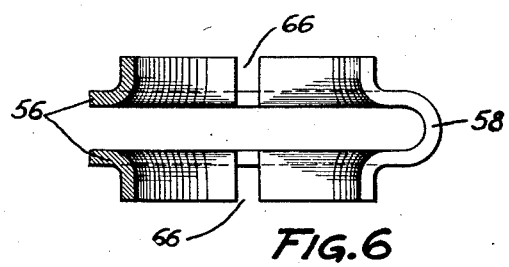
INVENTOR.
WILLIAM J. ANDRES
BY Jerome R. Cox
ATTORNEY Patented July 24, 1934

1,967,389

UNITED STATES PATENT OFFICE

1,967,389

BRAKE OPERATING MECHANISM

William J. Andres, South Bend, Ind., assignor to Bendix Aviation Corporation, South Bend, Ind., a corporation of Delaware Original application March 2, 1929, Serial No. 343,963. Divided and this application October 5, 1931, Serial No. 566,945

4 Claims. (Cl. 287—52.02)

This invention relates to brakes and is illustrated as embodied in novel shaft mechanism for operating a system of four wheel automobile brakes.

This application is a division of a co-pending application for a patent for improvements in brakes, Serial No. 343,963 filed by the present applicant on March 2nd, 1929 and concerns particularly operating levers such as are illustrated as included in the operating mechanism shown in said co-pending application.

An object of the invention is to provide strong but inexpensive mechanism in which most of the parts can be made up as steel stampings. Various features of novelty relate to a novel one-way lever for operating the shaft, and to simplified operating levers mounted on and keyed to the shaft.

The above and other objects and features of the invention, including various novel and desirable structural details, will be apparent from the following description of the illustrative embodiment shown in the accompanying drawing, in which:

Figure 1 is a top plan view of an automobile chassis, showing the arrangement of the novel shaft mechanism;

Figure 2 is a section on the line 2—2 of Figure 1, showing the shaft mechanism in rear elevation;

Figure 3 is a section on the line 3—3 of Figure 1, showing the improved one-way lever in side elevation;

Figure 4 is a section through the lever on line 4—4 of Figure 3;

Figure 5 is an elevation of the shaft mechanism, looking in the direction of the arrows 5—5 in Figure 1;

Figure 6 is a horizontal section, on the line 6—6 of Figure 5, through one of the operating levers on the shaft; and Figure 7 is a rear elevation of this lever.

The chassis illustrated includes a frame 10 supported on axles 12 and 14 provided with road wheels 16 having brakes 18 operated by rods or the like 20. The brakes are operated through rods 20 by a novel transverse shaft 22 connected by a rod or the like 24 to a pedal 26 or other operating device. The present invention relates to shaft 22 or its equivalent, and to its mounting and operation. More particularly, it relates to the novel levers mounted upon said shaft for connecting it to the brakes 18 and to the pedal 26.

The shaft itself in order to secure lightness and strength in an inexpensive construction, may be a length of tubing, bent or cranked as at 28 to clear the propeller shaft. At its ends the shaft is preferably journaled in a mounting comprising three pivots, carried by the frame 10 and spaced approximately 120° apart around the shaft, and on which are mounted relatively large stamped steel rollers engaging and jointly embracing the shaft.

Each lever 54 mounted on the end of shaft 22 and to the upper and lower ends of which rods 20 are connected, comprises preferably a steel stamping including lever portions 56 bent parallel to each other and connected by spaced webs 58, spaced apart but in vertical alignment. Webs 58 are generally cylindrical and cooperate with side portions 56 to define two aligned bosses adapted to receive a clamping bolt 60 which can be tightened to contract the hub of the lever on the shaft. The ends of rods 20 project between the spaced side lever portions 56 and are connected thereto by transverse pivots 62.

A transverse key 64 may be pressed into place in each end of shaft 22, through suitable openings formed therein, the key being of such a length that one or both of the ends projects beyond the periphery of the shaft. Lever 54 has notches 66 extending transversely across its hub, to receive the projecting ends of key 64 when the lever is slid into place axially of the shaft. When so moved into place, the tightening of bolt 60 holds it there.

A novel one-way connection between lever or pedal 26 and the shaft is provided. Preferably this is in the form of a stamped steel lever having spaced parallel sides 70 embracing between them the end of rod 24 and connected thereto by a pivot 72. These sides 70 are integrally connected by a web 74. Lug portions 76 stamped from the sides 70 project transversely edge to edge across the space between the sides.

After the above described lever is slid axially into place on shaft 22, with its hub embracing the shaft, a stamping 80 is welded to the exterior of the shaft between the sides 70, thus preventing axial shifting of the lever. Stamping 80 is bent to form an abrupt shoulder or stop which is operatively engaged by the lugs 76 of the lever when the lever is turned counter-clockwise (Figure 3).

While various illustrative constructions have been described in detail, it is not my intention to limit the scope of the invention to those particular constructions, or otherwise than by the terms of the appended claims.

I claim:

1. A shaft having a diametral key projecting beyond its periphery, in combination with a lever having a slotted hub embracing the shaft and adapted to be contracted to clamp the lever on the shaft and which hub is diametrically notched at points spaced approximately 90° from the slot of the hub to fit over the projecting portion of the key when the lever is slid into place by movement axially of the shaft.

2. Shaft mechanism comprising, in combination a shaft formed of a section of tubing and having a separately formed radially extending projection welded to said shaft and retracted on itself to form a triangular projection, and a one-way operating lever rotatably mounted on the shaft and having spaced parallel portions embracing said projection between them to hold the lever axially of the shaft, and having integral parts extending crosswise of the space between the two portions and adapted operatively to engage said projection when the lever is turned in one direction to limit relative rotational movement, a pivotal connection secured to said spaced portions at one end of the lever, and an operating member secured to said lever by means of said pivotal connection.

3. Shaft mechanism comprising in combination, a shaft having a radially extending projection, and a one-piece operating lever rotatably mounted on the shaft and formed with parallel spaced sides embracing said projection between them to hold the lever axially of the shaft, one of said parallel spaced sides being formed with an opening and having an integral portion of the side adjacent to the opening extending inward and at times engaging the projection.

4. Shaft mechanism comprising in combination, a shaft having a radially extending projection, and a one-piece operating lever rotatably mounted on the shaft and formed with parallel spaced sides embracing said projection between them to hold the lever axially of the shaft, said parallel spaced sides being each formed with openings and having integral portions of the sides adjacent to the openings extending inward to contact with each other and at times engaging the projection.

WILLIAM J. ANDRES.